United States Patent [19]

Ison et al.

[11] Patent Number: 4,904,505
[45] Date of Patent: Feb. 27, 1990

[54] LUBRICANT MIST COATING OF METAL SHEET

[75] Inventors: Daniel L. Ison, Sandy Hook, Ky.; Jack Hester, Middletown, Ohio

[73] Assignee: Armco Inc., Middletown, Ohio

[21] Appl. No.: 169,803

[22] Filed: Mar. 18, 1988

[51] Int. Cl.$^4$ .............................................. B05D 1/02
[52] U.S. Cl. ...................................... 427/424; 427/421
[58] Field of Search ............... 427/424, 421; 118/315, 118/684, 323

[56] References Cited

U.S. PATENT DOCUMENTS

| | | | |
|---|---|---|---|
| 2,710,589 | 6/1955 | Brunner | 118/51 |
| 3,037,900 | 6/1962 | Hings | 427/421 |
| 3,736,902 | 6/1973 | Glanzer | 118/50 |
| 3,814,322 | 6/1974 | Waldrum | 239/251 |
| 3,937,175 | 2/1976 | Horner | 118/315 |
| 4,018,303 | 4/1977 | White et al. | 184/6.26 |
| 4,072,772 | 2/1978 | Franz | 427/424 |
| 4,278,711 | 7/1981 | Sullivan | 427/284 |
| 4,337,281 | 6/1982 | Boone | 427/236 |
| 4,374,168 | 2/1983 | Wojtowicz | 428/212 |
| 4,378,386 | 3/1983 | Rehman | 118/315 |
| 4,381,726 | 5/1983 | Hojberg | 118/315 |

OTHER PUBLICATIONS

N. A. Fuchs "The Mechanics of Aerosols" The MacMillan Company, New York, 1964, pp. 46, 47, 151.

Primary Examiner—Shrive Beck
Assistant Examiner—Vi Duong Dang
Attorney, Agent, or Firm—R. J. Bunyard; L. A. Fillnow; R. H. Johnson

[57] ABSTRACT

Apparatus and method for coating the top surface of a high speed metal sheet with a thin film of lubricant having a uniform thickness. The apparatus includes a header assembly positioned above the moving sheet, a plurality of spray nozzles inclined at an angle relative to the oncoming sheet, and a solenoid operated valve to control flow of lubricant through each of the spray nozzles. The orifice of each nozzle is sized to produce a mist. The angle of inclination of the spray nozzles is sufficiently large so that the mist is generally sprayed above rather than toward the sheet. The method includes selecting a specific spray nozzle arrangement and adjusting the header assembly so that the span of the mist corresponds to the width of the metal sheet. An extremely thin and uniform thickness of lubricant film is formed on the sheet as the particles of mist settle onto the sheet. Waste of lubricant is minimized.

7 Claims, 4 Drawing Sheets

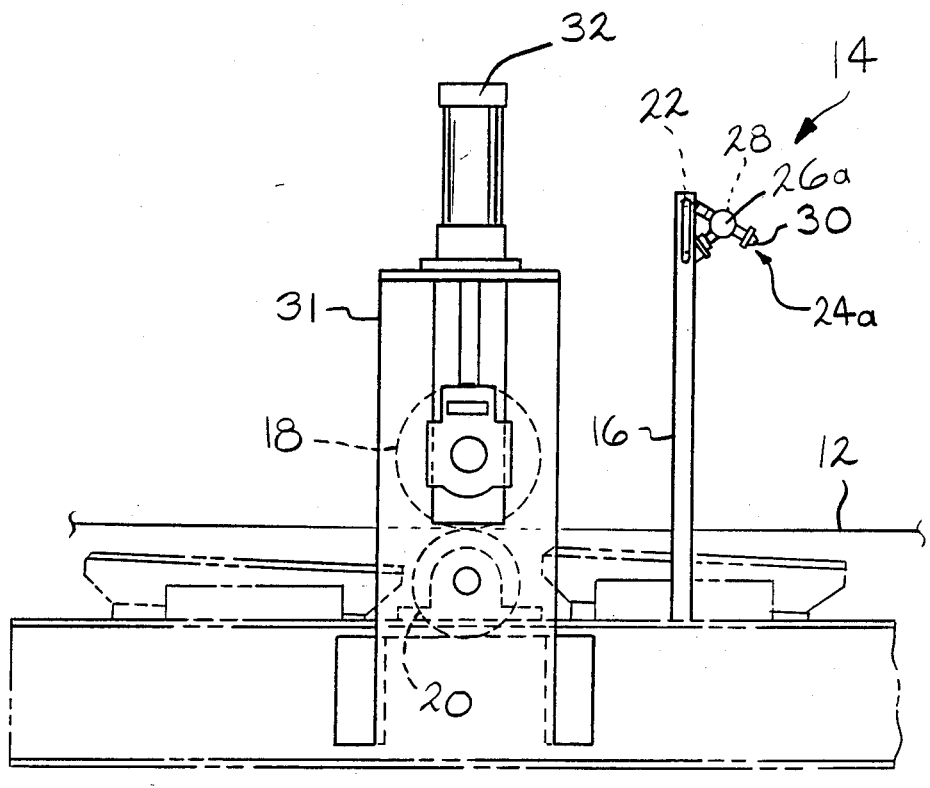
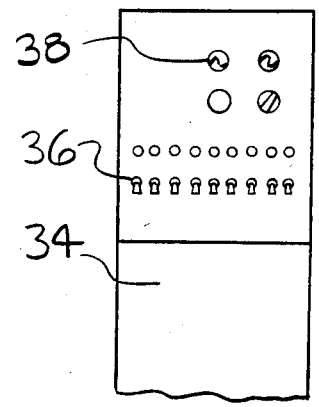
FIG. 2

LUBRICANT MIST COATING OF METAL SHEET

TECHNICAL FIELD

This invention relates to an apparatus and method for coating the top surface of metal sheet with a lubricant mist. More particularly, the invention relates to forming a thin film of lubricant having a uniform thickness onto a moving sheet by not directly impinging the mist onto the metal sheet.

BACKGROUND OF THE INVENTION

It is well known the effectiveness of oil-type drawing lubricants is primarily a function of viscosity. For high viscosity lubricants, extremely thin films e.g. 50 microinch (0.001 mm) are adequate to permit deep drawing of a metal sheet. One such lubricant used primarily on ferrous metal sheet for automotive applications includes a dispersion of a high viscosity liquid polar lubricant dispersed as a discontinuous phase in an anhydrous liquid having a relatively low viscosity. This two-phase lubricant is disclosed in U.S. Pat. No. 4,374,168, incorporated herein by reference.

Liquid lubricants are generally applied to a metal sheet by direct impingement onto a metal sheet or onto an applicator roller. The lubricated metal sheet must pass between high pressure steel or synthetic squeegee rollers to insure the lubricant is completely distributed over the entire surface of the metal sheet. However, it is difficult to obtain high viscosity thin lubricant films having a thickness less than 1000 microinch (0.025 mm). This excess lubricant causes severe problems if applied to coiled metal sheet in a steel mill. Because of the high viscosity of the thick film, it is difficult to apply sufficient tension to tightly rewind a coil during a processing operation. Such a coil tends to "squat" when removed from a rewinding mandrel. If the coil inner diameter closes excessively, the coil must be scraped since it cannot be unwound in subsequent processing. Such a loosely wound coil also tends to telescope during handling which can damage the coil and creates a safety hazard. If the sheet is stacked in cut lengths, feeding to a blanking press is difficult because the excess film thickness makes it difficult to break the surface tension between sheets.

More recently, there have been various attempts to apply a thin film of lubricant having a uniform thickness to a metal sheet by atomizing the lubricant into a spray of small droplets or mist. When the spray nozzles creating the mist are directed substantially perpendicular toward the metal sheet, the lubricant tends to be deposited in bands along the longitudinal direction of the sheet. This results in a non-uniform film thickness along the transverse direction even when using a squeegee roller. Others have enclosed the coating area with a spray chamber. A mist is sprayed into the chamber where the lubricant particles are charged electrostatically. The charged particles are attracted to the surface of the metal sheet. This approach is also undesirable because of the maintenance problems associated with the electrical equipment and recycling excess lubricant condensing within the chamber.

Accordingly, there remains a long felt need for a lubricated metal sheet having a thin film of uniform thickness and that is economical to produce. More particularly, there is a need to coat a thin film of high viscosity lubricant having a uniform thickness onto a metal sheet.

BRIEF SUMMARY OF THE INVENTION

The invention relates to coating the top surface of a metal sheet with a thin film of lubricant having a uniform thickness. The apparatus includes a header assembly positioned above a moving metal sheet, a pump for supplying pressurized lubricant to the header assembly, a spray nozzle, and means for controlling flow of lubricant through the spray nozzle. The orifice of the spray nozzle is sized to convert the pressurized lubricant to a mist. The spray nozzle is inclined at an angle relative to the metal sheet to prevent direct impingement of the mist against the surface of the metal sheet. The method includes selecting a specific arrangement of spray nozzles so that the span of the mist can be adjusted to approximately the width of the metal sheet.

It is a principal object of this invention to form a thin film of lubricant having a uniform thickness onto a moving metal sheet.

A feature of our invention is to spray a lubricant mist above a metal sheet so that the mist particles settle by gravity and form a thin film of the lubricant having uniform thickness onto the metal sheet.

Another feature of our invention is to cause lubricant to be sprayed at predetermined intervals of time onto a metal sheet.

Another feature of our invention is to use a distribution roller having an absorbent surface for transferring lubricant between the roller and a metal sheet when lubricant flow is cycled at predetermined time intervals.

Another feature of our invention is to select a specific nozzle arrangement so that the span of the mist more nearly corresponds to the width of a metal sheet.

An advantage of the invention is cost reduction by minimizing damage to metal sheet during processing and minimization of lubricant used.

Another advantage is improved safety in the work place.

The above and other objects, features and advantages of this invention will become apparent upon consideration of the detailed description and appended drawings.

BRIEF DESCRIPTION OF THE DRAWINGS

FIG. 2 is a side view of the coating apparatus of FIG. 1.

DETAILED DESCRIPTION OF THE PREFERRED EMBODIMENT

Figure 1:
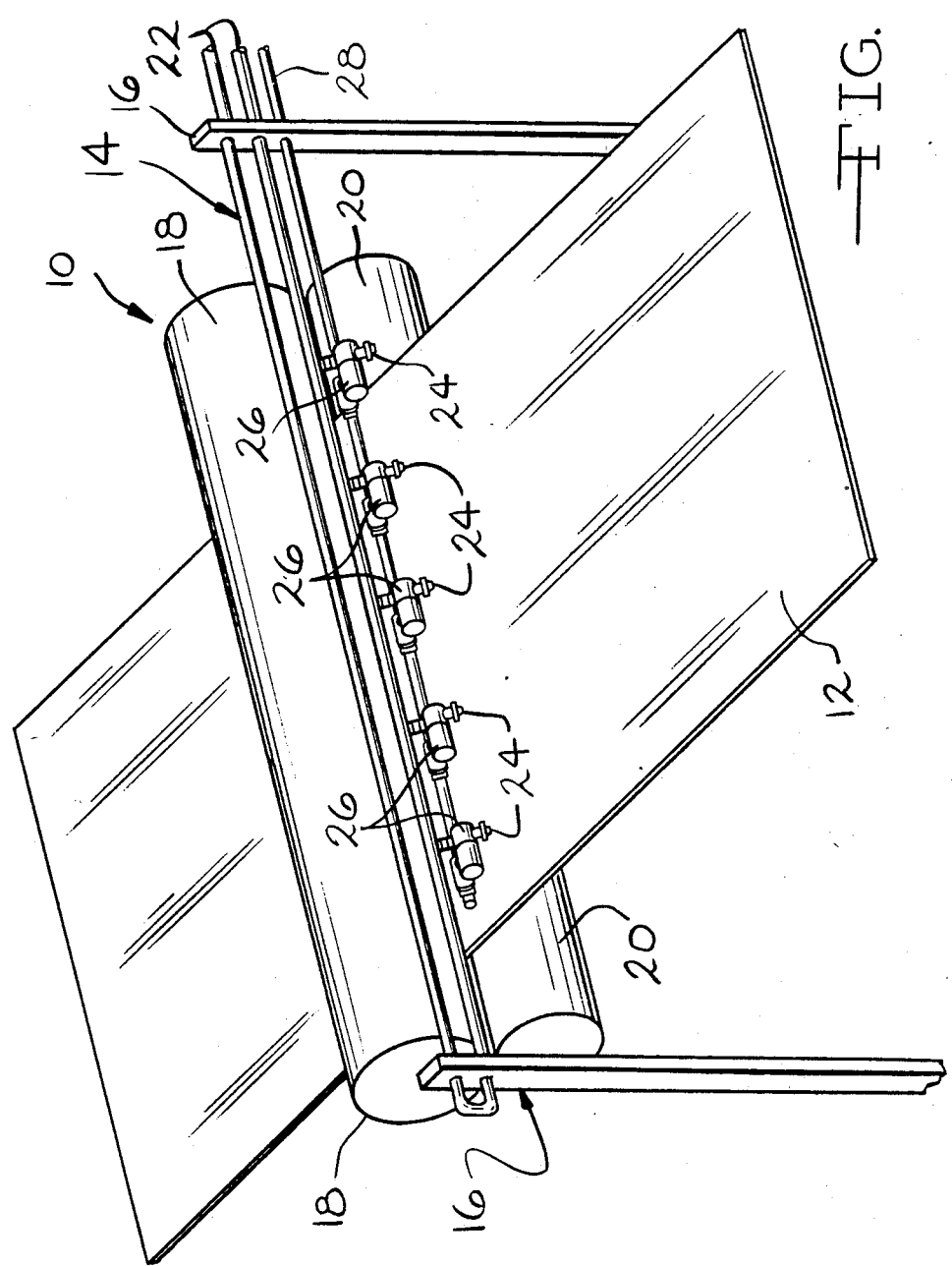
FIG. 1 is a perspective view of a mist coating apparatus of the invention for coating a metal sheet with a thin film of lubricant having a uniform thickness.

Referring to FIG. 1, reference numeral 10 generally illustrates an apparatus for coating a thin uniform thickness of lubricant onto a metal sheet 12. Sheet 12 may be unwound from a mandrel and passed through processing equipment such as a high speed temper mill, a slitter shear, and the like as is well known. Lubricating apparatus 10 may be incorporated in-line as part of this processing equipment. It will be understood metal sheet 12 could be continuous for rewinding into a coil or sheared into cut lengths, or could be previously cut into lengths prior to being lubricated. Lubricating apparatus 10 includes a header assembly 14, a pair of support frames 16, a lubricant distribution roller 18 having an absorbent surface, and a steel backup roller 20. A support mechanism 31 for rollers 18,20 has been removed for clarity (see FIG. 2). Header assembly 14 includes a recirculating line 22 for supplying a pressurized lubricant to a nozzle 24 threadably connected to line 22. To accommodate varying widths of sheet 12, a plurality of nozzles 24 are evenly spaced about 12 inches (30 cm.) apart along line 22 transversely to the pass line for sheet 12. As will be explained in detail later, apparatus 10 includes means for selectively controlling the flow of lubricant through each nozzle 24 by solenoid actuated valves 26.

FIG. 2 illustrates a side view of lubricating apparatus 10. Apparatus 10 preferably includes distribution roller 18 mounted on frame 31 for vertical displacement using a hydraulic air cylinder 32. The surface of roller 18 must be able to absorb some lubricant when engaging the upper surface of sheet 12 and resist cutting or tearing by sheared edges on sheet 12. Such a roller suitable for this purpose is known as a 3M Brand Mill Roll available from 3M Company of St. Paul, Minn. The 3M roller is a laminated construction formed by bonding thin, high strength discs of a non-woven material onto a steel shaft.

Lubricant line 22 of header 14 is mounted onto support 16 a short distance above sheet 12. We have determined a distance of about 18 inches (46 cm.) is preferred for applying a uniform thickness of lubricant across sheet 12 for most widths of sheet requiring a two-phase lubricant. As will be explained later, line 22 is mounted for vertical displacement onto support 16. Nozzles 24 are mounted along line 22 and directed toward oncoming sheet 12 at an inclined angle so that the mist passing from an orifice 30 is sprayed above the plane of sheet 12. Depending on the height above sheet 12, pressure of the lubricant, and the opening size of orifice 30, nozzles 24 apparently must be inclined at an angle of at least 30°, preferably greater than 40°, so that the lubricant mist from orifice 30 does not impinge directly onto sheet 12. Apparatus 10 also includes an operator's console 34 having off-on switches 36 for selectively turning one or more nozzles 24 on or off by opening or closing respectively valve 26 associated with each nozzle. After a nozzle has been turned on, lubricant may be flowed cyclically through the nozzle by use of a timer 38. The electrical circuitry for controlling valves 26 is contained in a conduit 28.

In addition to nozzle angle, another critical factor for controlling film thickness uniformity is the size of the opening in orifice 30. For operating pressures of about 20-100 psi (15-70 kg/mm$^2$), the size of orifice 30 should be about 0.01-0.04 inches (0.25-1 mm). For an orifice size greater than about 0.04 inch (1 mm), the lubricant flows from nozzle 24 as a liquid rather than a mist resulting in a thick film of lubricant having a nonuniform thickness. For sizes smaller than about 0.01 inch (0.25 mm), the lubricant may become atomized wherein the mist particles tend to remain airborne. The mist particles must have sufficient mass to settle by gravity onto sheet 12. We have determined by maintaining the lubricant at a pressure of about 65 psi (46 kg/mm$^2$) while inclining nozzle 24 at an angle of about 45° relative to sheet 12 and using orifice 30 having an opening of 0.015 to 0.028 inches (0.38-0.71 mm), a thin film of lubricant having a uniform thickness can be applied to the entire upper surface of a metal sheet.

The span of each nozzle 24 as measured by the width of mist particles settling onto sheet 12 is about 32 inches (81 cm). For five nozzles spaced 12 inches (30 cm) apart, a metal sheet up to about 80 inches (200 cm) wide can be lubricated. Since lubricant flow is individually controlled for each nozzle 24 by its corresponding valve 26 and switch 36, the nozzles can be conditioned or operated in a specific arrangement that most closely accommodates the width of the sheet to be lubricated.

Figure 3:
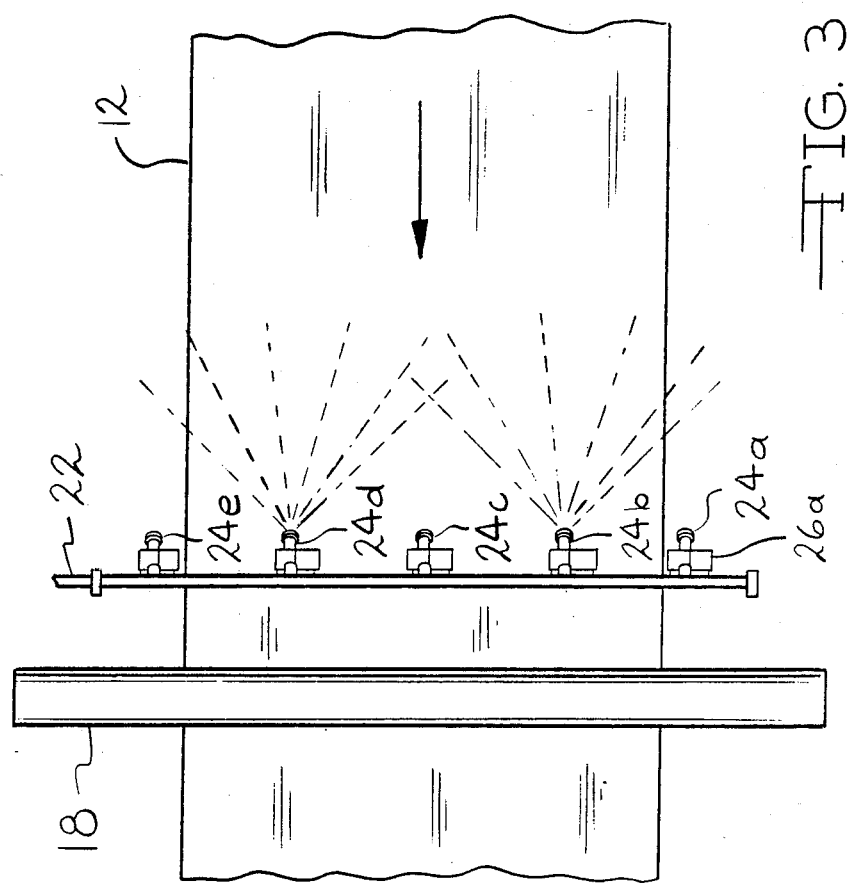
FIG. 3 is a top view of the coating apparatus of FIG. 1.

FIG. 3 illustrates a top view of our apparatus 10 including nozzles 24 $a-e$ each having corresponding valves 26 $a-e$. For clarity, frame 31 for roller 18 has again been removed. For metal sheet 32 inches (81 cm) wide or less, the operator would activate middle nozzle 24$c$ with the remaining nozzles being turned off. For metal sheet wider than 32 inches (81 cm), the span of a single nozzle would not cover the full width. Accordingly, for sheets widths up to about 56 inches (142 cm), the operator would turn off nozzle 24$c$ and turn on nozzles 24$b$ and 24$d$ as illustrated in FIG. 3. For wider width sheet, the operator would turn off nozzles 24$b$, 24$d$ and turn on nozzles 24$a$, 24$c$, 24$e$.

The width of span of each nozzle is a function of nozzle angle relative to sheet 12 and height of the nozzles above sheet 12. The width of span can be decreased somewhat by decreasing the nozzle angle and/or lowering the nozzles. Conversely, the width of span of each nozzle can be increased by raising the nozzles higher above sheet 12 and/or increasing the nozzle angle relative to sheet 12. This feature of our invention allows the operator latitude when selecting nozzles for a specific width of sheet to insure complete lubricant coverage over the full width of a sheet. It also allows the operator to minimize overspraying the edges of the sheet to minimize waste of lubricant. For example, FIG. 3 illustrates nozzles 24$b$, 24$d$ slightly overspraying sheet 12. By lowering header 14 and/or decreasing the angle of the nozzles, the width of the span of the mist settling onto sheet 12 could be reduced to approximately the width of sheet 12 thereby minimizing waste.

One conventional practice of applying a lubricant to a metal sheet is to directly impinge liquid streams of lubricant onto the metal surface. This practice lays parallel bands of lubricant in the longitudinal direction of the sheet. A rubber or steel squeegee roller is used to spread the lubricant over the entire surface of the sheet. This results in waste because of excess lubricant applied to the sheet surface and a nonuniform film thickness across the transverse direction of the sheet. As illustrated in FIG. 3 when spraying lubricant as a mist which settles onto the sheet surface by gravity, a thin film of lubricant particles having a uniform thickness is deposited across the width of the sheet surface.

It will be understood the line speed will vary for steel sheet being lubricated depending on the type of processing equipment used. For example, the line speed of steel mill rewind or slitter shear equipment may range from a few feet per minute (if inspection of the sheet surface is required) up to 800 ft/min (245 m/min) or more. A high speed temper mill can be operated at line speeds of 2000 ft/min (610 m/min) or more. Nevertheless, the customer frequently requires a specific film thickness of lubricant regardless of the last operation used by the steel manufacturer when applying the lubricant. For example, one automotive customer presently requires a thin two-phase lubricant film of 250-350 mg/ft$^2$ (23-33 mg/m$^2$) on each side of the sheet. Since approximately half of the lubricant is transferred to the opposite side when a lubricated sheet is coiled or stacked, the lubricating apparatus must apply about 500–700 mg/ft² (46–66 mg/m²) of lubricant to the top surface of the sheet. However, even at relatively high line speeds of say 700 ft/min (213 m/min), applying lubricant as a mist resulted in as much as 90 mg/m² on the top surface of the sheet. Accordingly, we included a timer in our means for controlling lubricant flow through each spray nozzle to further reduce film thickness. It will be understood other means for cycling lubricant flow could be used such as a footage counter. For example, for lubricating sheet 1 mm thick and 1525 mm wide at a speed of 122 m/min, solenoids 26 a, c, e were set to turn nozzles 24 a, c, e on for two seconds, off for one second, on for two seconds, etc.

When such cycling of nozzles 24 was required to reduce the amount of lubricant on a metal sheet, use of distribution roller 18 was required. When roller 18 engaged the surface of lubricated sheet 12, some of the lubricant on the sheet 12 was absorbed into the surface of roller 18. The lubricant absorbed by roller 18 was reapplied to those areas of sheet 12 which were not lubricated when nozzles 24 were briefly turned off. In the example above, some of the lubricant applied to the sheet surface during the two second on-sequences was removed by roller 18 and transferred back to the sheet surface in those areas when nozzle 24 was turned off during the one second off-sequences of each cycle. For the sheet width, line speed and off-on sequence given in the example above, we formed a very thin film of 70 mg/m² or less and that was uniform in thickness in the transverse direction across the sheet. When the lubricant thickness specified is greater or when line speeds are increased, cycling of nozzles 24 and use of distribution roller 18 would not be required.

Figure 4:
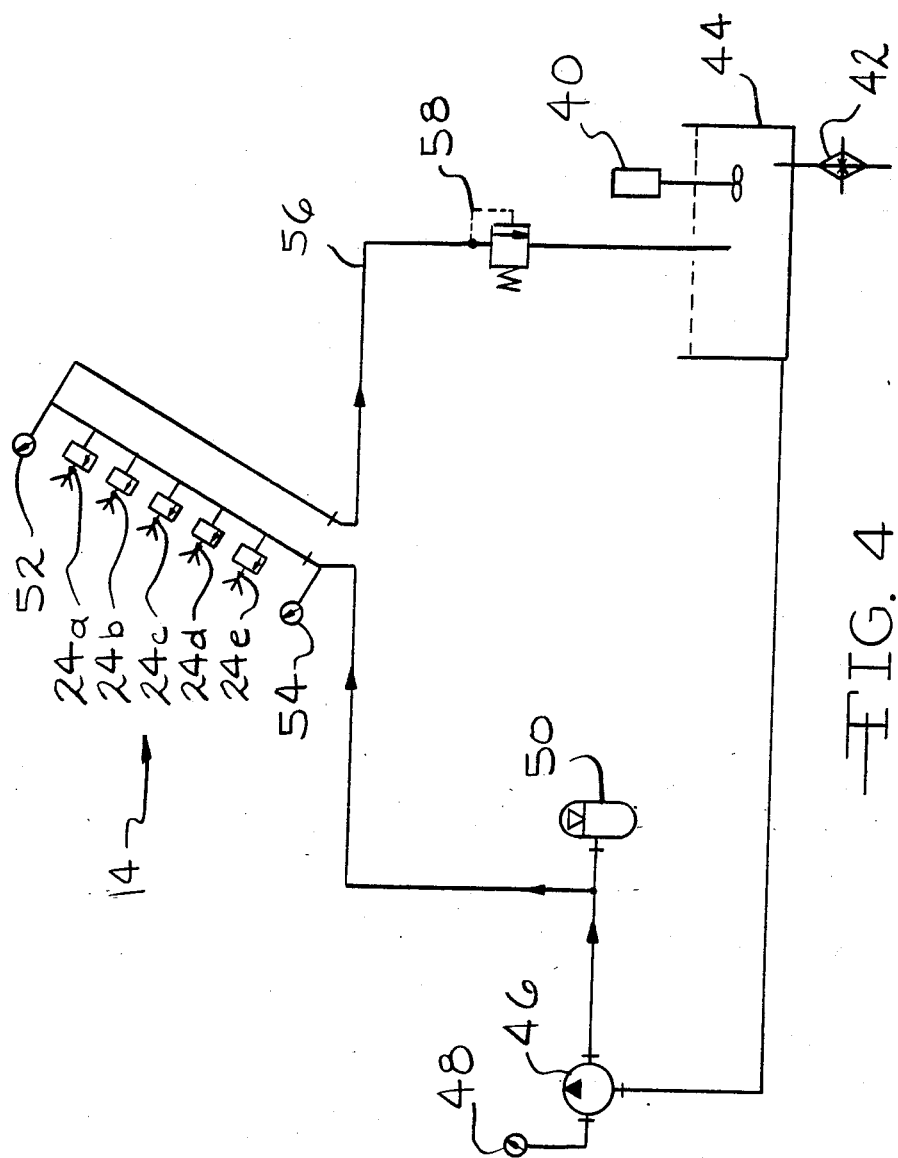
FIG. 4 is a schematic view of the coating apparatus.

FIG. 4 illustrates a schematic of one embodiment of our invention for applying a two-phase lubricant recommended for deep drawing steel for automotive stampings. One such lubricant is sold under the trade name of SP-7000 by H. A. Montgomery of Detroit, Mich. To prevent separation of the lubricant phases and maintain the recommended viscosity, the lubricant was agitated by a mixer 40 and maintained at a temperature of about 38° C. by a heater 42 in a tank 44. Pressured lubricant was supplied to header 14 by pump 46 with the pressure regulated by a gauge 48. An accumulator 50 maintained constant pressure to header 14 to prevent pulsing of the mist from nozzles 24. Header 14 also included a temperature gauge 52 and a pressure gauge 54 for adjusting pressure on nozzles 24 near the operator console. Lubricant not applied to the metal sheet was returned to tank 44 through a return line 56 passing through a pressure relief valve 58 and reheated to the recommended temperature in tank 44.

Various modifications can be made to our invention without departing from the spirit and scope of it. For example, the spray nozzles can be inclined at various angles allowing the mist to be sprayed generally above the metal sheet thereby allowing the mist particles to be dispersed uniformly into a cloud prior to settling by gravity rather than being impinged directly onto the sheet. For processing lines operated at slow line speeds, the lubricating apparatus could include a lubricant distribution roller having an absorbent surface positioned after the header assembly and the flow control means could include means for cycling lubricant flow. For example, the spray nozzle selected for coating a slow moving metal sheet could be operated intermittently by a timer. Excess lubricant would be absorbed by the absorbent distribution roller from the metal sheet surface when the spray nozzle is operating. Prior to the distribution roller becoming saturated, the spray nozzle would be turned off and lubricant transferred from the distribution roller to the uncoated surface of the metal sheet. Therefore, the limits of the invention should be determined from the appended claims.

We claim:

1. A method of coating the top surface of a metal sheet with a lubricant, comprising the steps of:
   providing a spray header above a pass line for a metal sheet,
   said spray header including a plurality of nozzles inclined at an angle and aligned longitudinally relative to said pass line,
   providing a first metal sheet having a first width,
   conditioning said nozzles to provide a first nozzle arrangement corresponding to said first width,
   passing said first metal sheet having said first width below said spray header,
   spraying a lubricant mist above said first sheet which settles by gravity onto said first sheet,
   providing a second metal sheet having a second width,
   conditioning said nozzles to provide a second nozzle arrangement corresponding to said second width,
   passing said second metal sheet having said second width below said spray header,
   and spraying said lubricant mist above said second sheet which settles by gravity onto said second sheet,
   thereby forming a thin film of said lubricant having a uniform thickness across said sheets.

2. The method of claim 1 wherein said film is less than 70 mg/m².

3. The method of claim 1 wherein said angle is at least 40° and the orifices of said nozzles are about 0.25–1 mm.

4. The method of claim 1 including the additional step of adjusting said spray header so that the span of said mist is substantially the same as said width of said sheets.

5. A method of coating the top surface of a metal sheet with a lubricant, comprising the steps of:
   providing a spray header above a pass line for a metal sheet,
   said spray header including a plurality of nozzles inclined at an angle and aligned longitudinally relative to said pass line,
   providing a first metal sheet having a first width
   conditioning said nozzles to provide a first nozzle arrangement corresponding to said first width,
   passing said first metal sheet having said first width below said spray header,
   spraying a lubricant mist for predetermined intervals of time above said first sheet which settles by gravity onto said first sheet,
   engaging said first sheet with a distribution roller,
   said roller including an absorbent surface for transferring said lubricant between said roller and said first sheet,
   providing a second metal sheet having a second width,
   conditioning said nozzles to provide a second nozzle arrangement corresponding to said second width,
   passing said second metal sheet having said second width below said spray header, spraying said lubricant mist for predetermined intervals of time above said second sheet which settles by gravity onto said second sheet,
and engaging said second sheet with said distribution roller,
thereby forming a thin film of said lubricant having a uniform thickness across said sheets.

6. A method of coating the top surface of a metal sheet with a lubricant, comprising the steps of:
providing a spray header above a pass line for a metal sheet,
said spray header including a plurality of nozzles inclined at an angle and aligned longitudinally relative to said pass line,
providing a first metal sheet having a first width,
conditioning said nozzles to provide a first nozzle arrangement corresponding to said first width,
passing said first metal sheet having said first width below said spray header,
spraying a lubricant mist above said first sheet which settles by gravity onto said first sheet,
said mist including a high viscosity lubricant dispersed as a discontinuous phase in a relatively low viscosity liquid,
engaging said first sheet with a distribution roller,
said roller including an abosorbent surface for transferring said lubricant between said roller and said first sheet,
providing a second metal sheet having a second width,
conditioning said nozzles to provide a second nozzle arrangement corresponding to said second width,
passing said second sheet having said second width below said spray header,
spraying said lubricant mist above said second sheet which settles by gravity onto said second sheet,
engaging said second sheet with said distribution roller,
thereby forming a thin film of said lubricant having a uniform thickness of less than about 70 mg/m$^2$ across said sheets.

7. A method of coating the top surface of a metal sheet with a lubricant, comprising the steps of:
providing a spray header above a pass line for a metal sheet,
said spray header including a plurality of nozzles inclined at an angle and aligned longitudinally relative to said pass line,
providing a first metal sheet having a first width,
conditioning said nozzles to provide a first nozzle arrangement corresponding to said first width,
passing said first metal sheet having said first width below said spray header,
spraying a mist for predetermined intervals of time above said first sheet which settles by gravity onto said first sheet,
said mist including a high viscosity lubricant dispersed as a discontinuous phase in a relatively low viscosity liquid,
engaging said first sheet with a distribution roller,
said roller including an absorbent surface for transferring said lubricant between said roller and said first sheet,
providing a second metal sheet having a second width,
conditioning said nozzles to provide a second nozzle arrangement corresponding to said second width,
passing said second metal sheet having said second width below said spray header,
spraying said lubricant mist for predetermined intervals of time above said second sheet which settles by gravity onto said second sheet,
engaging said second sheet with said distribution roller,
thereby forming a thin film of said lubricant having a uniform thickness of less than about 70 mg/m$^2$ across said sheets.

* * * * *